United States Patent [19]
Orr

[11] Patent Number: 6,158,140
[45] Date of Patent: Dec. 12, 2000

[54] GOLF CART FAN WITH MULTIPLE POSITIONS

[76] Inventor: James K. Orr, P.O. Box 71322, Newnan, Ga. 30217

[21] Appl. No.: 09/528,303

[22] Filed: Mar. 17, 2000

[51] Int. Cl.[7] ..................................................... F26B 19/00
[52] U.S. Cl. ..................................................... 34/62; 34/91
[58] Field of Search ................................... 34/60, 61, 62, 34/90, 91, 104; 180/2.2, 65.3, 65.5, 65.6, 900; 62/239, 244; 392/380, 382, 384; 237/12.3 C, 12.3 R, 12.3 A

[56] References Cited

U.S. PATENT DOCUMENTS

| | | | |
|---|---|---|---|
| 4,899,931 | 2/1990 | Isley | 237/12.3 C |
| 5,112,535 | 5/1992 | Roberson | 261/27 |
| 5,613,371 | 3/1997 | Nelson | 62/244 |
| 5,725,062 | 3/1998 | Fronek | 180/2.2 |
| 5,873,178 | 2/1999 | Johnson | 34/202 |
| 5,983,518 | 11/1999 | Ellenburg | 34/106 |

Primary Examiner—Stephen Gravini

[57] ABSTRACT

A golf cart fan with multiple positions for providing a cooling fan for occupants of a golf cart that may be pivoted about two axes for enhanced positionability of the fan. The golf cart passenger cooling system for use with a suitable golf cart generally having a dash portion, an upper edge portion, and a forward opening. The cooling system generally includes a fan assembly including a perimeter frame for defining a perimeter about an interior of the fan assembly. The perimeter frame has substantially planar front and rear openings. The cooling system also includes a fan support assembly mounted on the fan assembly. The fan support assembly is adapted for mounting to the golf cart for supporting the fan assembly on the golf cart. The fan support assembly provides pivoting adjustment of the orientation of the fan assembly about at least two axes with respect to the golf cart. The fan support assembly is adapted to permit pivoting of the fan assembly about a horizontally-oriented axis and about a vertically-oriented axis to allow swing movement of the fan assembly between a first position and a second position. The first position maximizes air flow through the forward opening. The second position minimizes obstruction of vision through the forward opening of the golf cart.

12 Claims, 3 Drawing Sheets

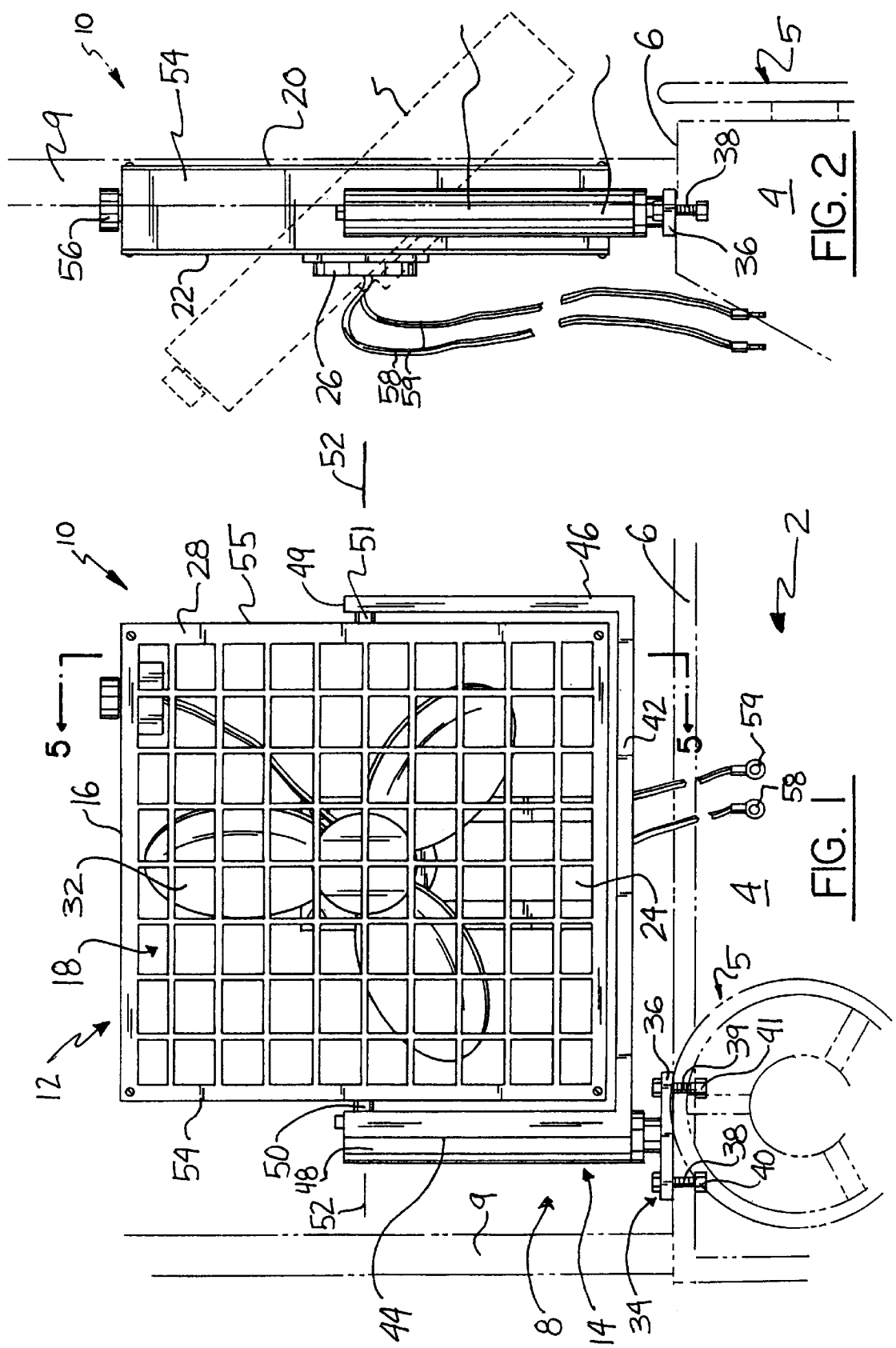

GOLF CART FAN WITH MULTIPLE POSITIONS

CROSS REFERENCE TO RELATED APPLICATION

This application is a substitute for U.S. application Ser. No. 08/648,382, filed May 15, 1996.

BACKGROUND OF THE INVENTION

1. Field of the Invention

The present invention relates to golf cart cooling fans and more particularly pertains to a new golf cart fan with multiple positions for providing a cooling fan for occupants of a golf cart that may be pivoted about two axes for enhanced positionability of the fan.

2. Description of the Prior Art

The use of golf cart cooling fans is known in the prior art. More specifically, golf cart cooling fans heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,164,690; U.S. Pat. No. 4,592,702; U.S. Pat. No. 4,846,399; U.S. Pat. No. 4,850,804; U.S. Pat. No. 4,899,931; U.S. Pat. No. 4,974,693; U.S. Pat. No. 5,112,535; U.S. Pat. No. 5,217,351; and U.S. Pat. No. Des. 354,127.

While these devices may fulfill their respective, particular objectives and requirements, the aforementioned patents do not disclose a new golf cart fan with multiple positions of the present invention. With particular respect to golf carts, the known cooling systems tend to be fixed in position on the golf cart with little or no adjustability of the direction of the air flow. Further, the positioning of the known cooling systems tends to be in locations that produce less than optimum cooling, such as in the roof of the golf cart, which produces an air flow that primarily strikes only the top of the head of the occupants of the cart. The mounting of the known devices typically hampers or prevents the easy and convenient adjustment of the direction of the air flow from the device. Known cart cooling devices generally require that the cooling system be part of the original equipment of the golf cart, or require significant modification of the golf cart for installation. Further, a system such as is described in U.S. Pat. No. 5,112,535 to Roberson requires the use of water for an evaporative cooling system, which limits the adjustability of positioning of the cooling system.

Further, the terrain that a cart is typically driven over requires a sturdy and balanced mounting that is adapted for the jostling that may be encountered while traversing golf courses.

In these respects, the golf cart fan with multiple positions according to the present invention substantially departs from the conventional concepts and designs of the prior art, and in so doing provides an apparatus primarily developed for the purpose of providing a cooling fan for occupants of a golf cart that may be pivoted about two axes for enhanced positionability of the fan.

SUMMARY OF THE INVENTION

In view of the foregoing disadvantages inherent in the known types of golf cart cooling fans now present in the prior art, the present invention provides a new golf cart fan with multiple positions construction wherein the same can be utilized for providing a cooling fan for occupants of a golf cart that may be pivoted about two axes for enhanced positionability of the fan.

The general purpose of the present invention, which will be described subsequently in greater detail, is to provide a new golf cart fan with multiple positions apparatus and method which has many of the advantages of the golf cart cooling fans mentioned heretofore and many novel features that result in a new golf cart fan with multiple positions which is not anticipated, rendered obvious, suggested, or even implied by any of the prior art golf cart cooling fans, either alone or in any combination thereof.

To attain this, the present invention generally comprises a golf cart passenger cooling system for use with a suitable golf cart generally having a dash portion with a steering wheel and an upper edge portion, and a forward opening for viewing through when operating the golf cart. The forward opening is defined by the upper edge portion and a roof support member. The golf cart suitably has an electrical power circuit. The cooling system generally includes a fan assembly including a perimeter frame for defining a perimeter about an interior of the fan assembly. The perimeter frame has substantially planar front and rear openings. The cooling system also includes a fan support assembly mounted on the fan assembly. The fan support assembly is adapted for mounting to the golf cart for supporting the fan assembly on the golf cart. The fan support assembly provides pivoting adjustment of the orientation of the fan assembly about at least two axes with respect to the golf cart. The fan support assembly is adapted to permit pivoting of the fan assembly about a horizontally-oriented axis and about a vertically-oriented axis to allow swing movement of the fan assembly between a first position and a second position. The first position is characterized by the fan assembly having the plane of the front opening oriented substantially parallel to the forward opening and the dash portion of the golf cart to maximize air flow through the forward opening. The second position is characterized by the fan assembly having the plane of the front opening oriented substantially perpendicular to the forward opening and the dash portion of the golf cart to minimize obstruction of vision of the occupants through the forward opening of the golf cart.

The fan support assembly may comprise a substantially horizontally oriented base member and a pair of substantially vertically oriented arm members mounted to the base member at spaced locations. The arm members have free upper ends pivotally connected to opposite locations on the perimeter frame of the fan assembly such that the frame pivots about an axis passing through the opposite locations. Preferably, each opposite location is at a medial location on one of a pair of side portions of the perimeter frame such that approximately half of the weight of the fan assembly is located on each side of the axis.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new golf cart fan with multiple positions which has many of the advantages of the golf cart cooling fans mentioned heretofore and many novel features that result in a new golf cart fan with multiple positions which is not anticipated, rendered obvious, suggested, or even implied by any of the prior art golf cart cooling fans, either alone or in any combination thereof.

It is another object of the present invention to provide a new golf cart fan with multiple positions which may be easily and efficiently manufactured and marketed.

It is a further object of the present invention to provide a new golf cart fan with multiple positions which is of a durable and reliable construction.

An even further object of the present invention is to provide a new golf cart fan with multiple positions which is susceptible of a low cost of manufacture with regard to both materials and labor, and which accordingly is then susceptible of low prices of sale to the consuming public, thereby making such golf cart fan with multiple positions economically available to the buying public.

Still yet another object of the present invention is to provide a new golf cart fan with multiple positions which provides in the apparatuses and methods of the prior art some of the advantages thereof, while simultaneously overcoming some of the disadvantages normally associated therewith.

Still another object of the present invention is to provide a new golf cart fan with multiple positions for providing a cooling fan for occupants of a golf cart that may be pivoted about two axes for enhanced positionability of the fan to direct air flow where it is most desired, especially if more than one person is riding in the cart.

Yet another object of the present invention is to provide a new golf cart fan with multiple positions which includes a golf cart passenger cooling system for use with a suitable golf cart generally having a dash portion and a forward opening for viewing through when operating the golf cart. The cooling system generally includes a fan assembly including a perimeter frame for defining a perimeter about an interior of the fan assembly. The perimeter frame has substantially planar front and rear openings. The cooling system also includes a fan support assembly mounted on the fan assembly. The fan support assembly is adapted for mounting to the golf cart for supporting the fan assembly on the golf cart.

Still yet another object of the present invention is to provide a new golf cart fan with multiple positions that is easily retrofitted to existing golf carts without extensive modification of the cart or special mounting structures, also similarly may be removed without damage to the cart.

Even still another object of the present invention is to provide a new golf cart fan with multiple positions that permits pivoting of the fan assembly about a horizontally-oriented axis and about a vertically-oriented axis to allow swing movement of the fan assembly between a first position and a second position. The first position is characterized by the fan assembly having the plane of the front opening oriented substantially parallel to the forward opening and the dash portion of the golf cart to maximize air flow through the forward opening. The second position is characterized by the fan assembly having the plane of the front opening oriented substantially perpendicular to the forward opening and the dash portion of the golf cart to minimize obstruction of vision through the forward opening of the golf cart.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a new electrical fan for a golf cart according to the present invention particularly illustrating the relationship of the fan to the golf cart dash portion.

FIG. 2 is a schematic side view of the present invention showing an alternate position of the fan with the fan pivoted about a horizontal axis.

DESCRIPTION OF THE PREFERRED EMBODIMENT

Figure 3:
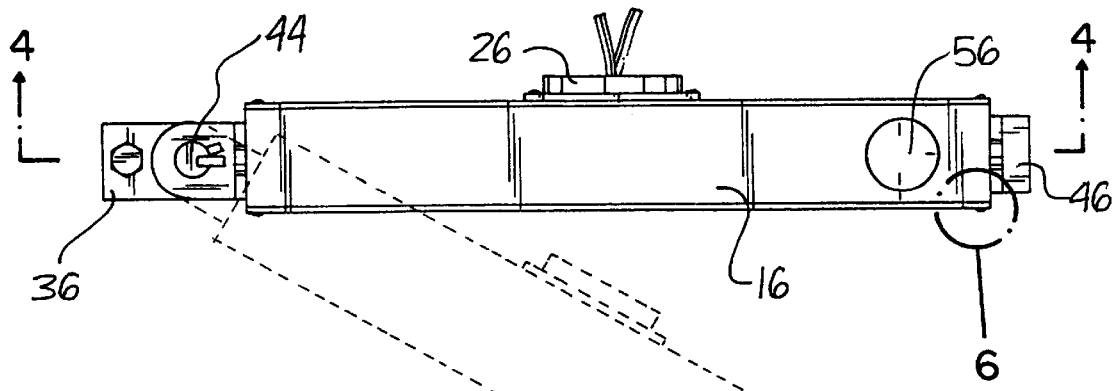
FIG. 3 is a schematic top view of the present invention showing an alternate position of the fan with the fan pivoted about a vertical axis.
Figure 4:
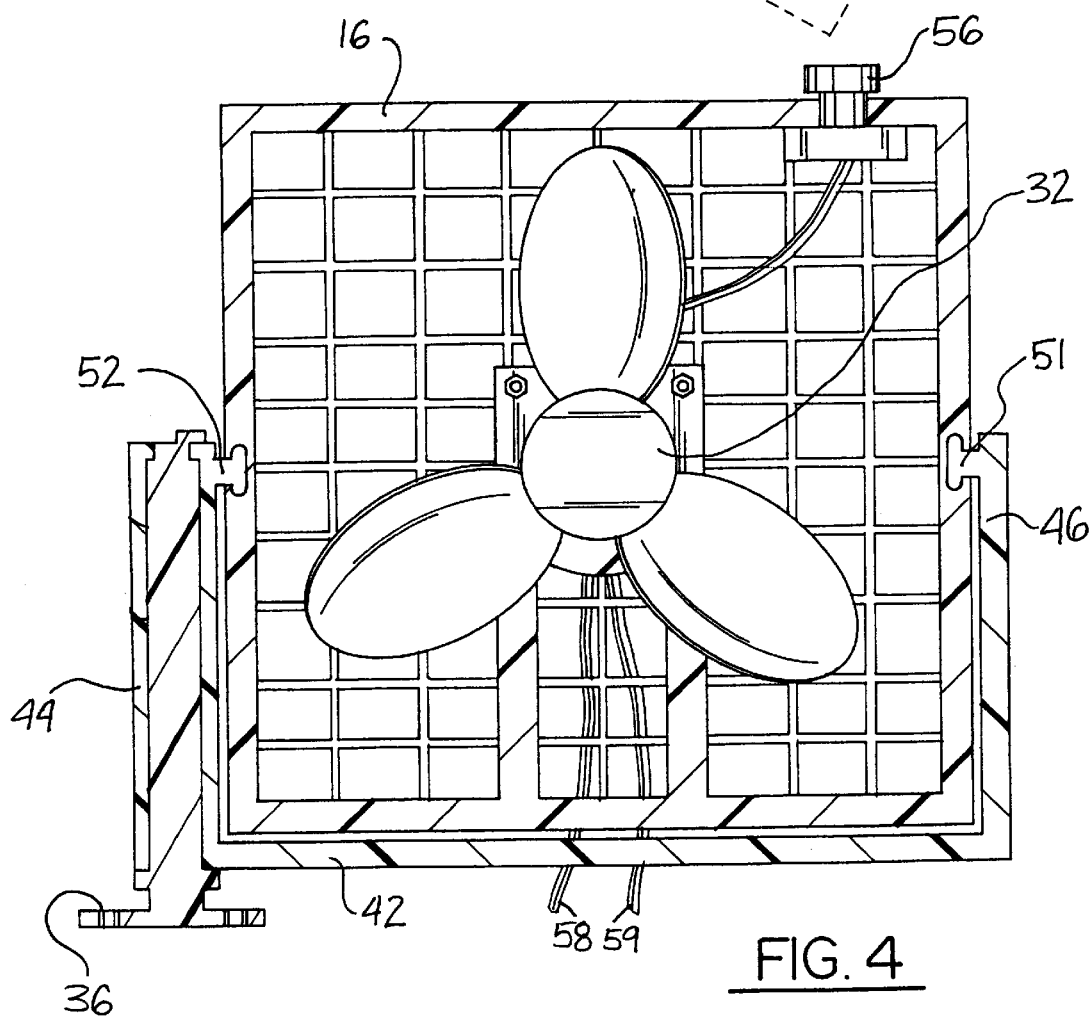
FIG. 4 is a schematic sectional view of the present invention taken along line 4—4 of FIG. 3.
Figure 6:
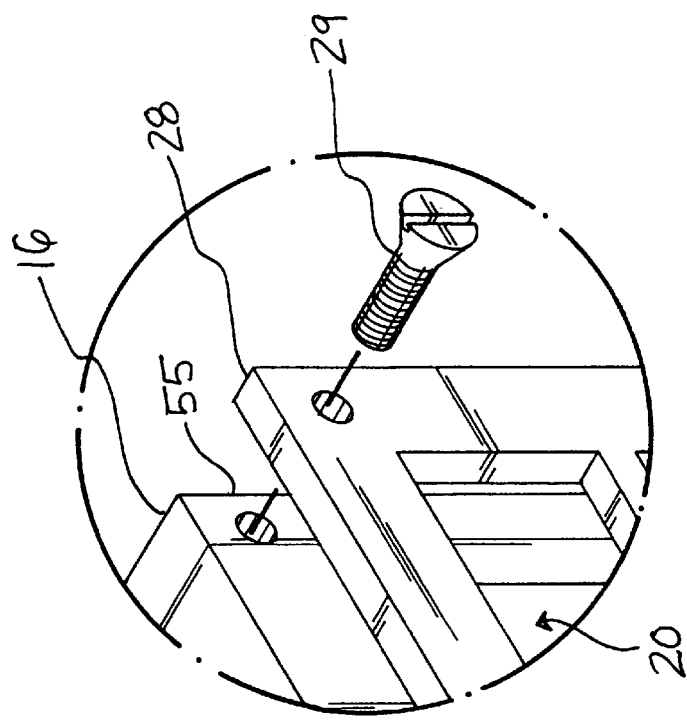
FIG. 6 is a schematic perspective view of a portion of the present invention circled in FIG. 3.
Figure 5:
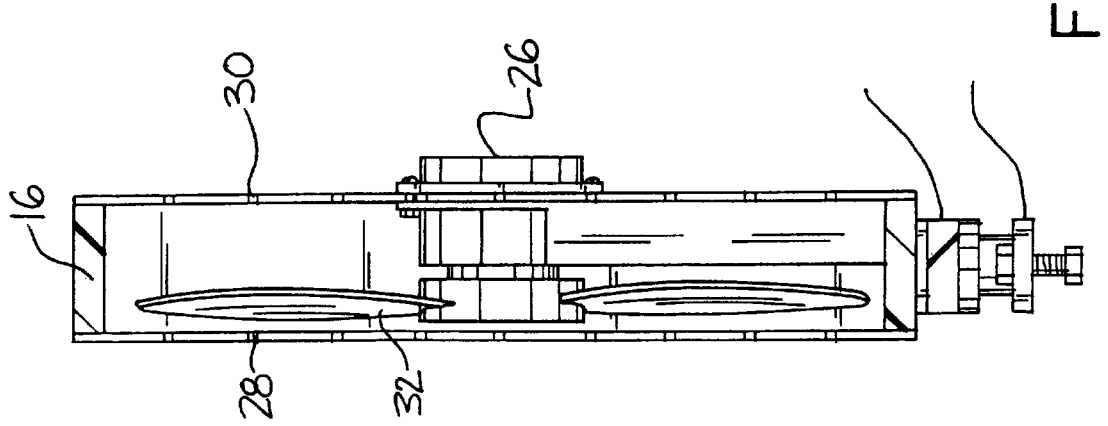
FIG. 5 is a schematic sectional view of the present invention taken along line 5—5 of FIG. 1.

With reference now to the drawings, and in particular to FIGS. 1 through 6 thereof, a new golf cart fan with multiple positions embodying the principles and concepts of the present invention and generally designated by the reference numeral 10 will be described.

As best illustrated in FIGS. 1 through 6, the electrical fan 10 is highly suitable for use on a golf cart 2 of the type having a dash portion 4 with a steering wheel 5 and an upper edge portion 6. The golf cart also has a forward opening 8 for viewing through when operating the golf cart, and the forward opening is defined in part by the upper edge portion 6 and a roof support member 9. The golf cart suitably has an electrical power circuit for powering the motive means of the cart and the fan.

The cooling system of the invention includes a fan assembly 12 and a fan support assembly 14 mounted on the fan assembly. The fan support assembly is adapted for mounting to the golf cart for supporting the fan assembly on the golf cart. The fan support assembly is most suitable mounted on the upper edge portion of the dash portion of the golf cart.

The fan assembly comprises a perimeter frame 16 for defining a perimeter about an interior 18 of the fan assembly. The perimeter frame has a substantially planar front opening 20 and rear opening 22 that each open into the interior of the perimeter frame. A fan support 24 is mounted on the perimeter frame and extends into the interior to a central location of the interior. A fan motor 26 is positioned in the interior of the perimeter frame, and is mounted on the fan support at a central location in the interior. A front grill 28 covers the front opening of the perimeter frame (and is secured by a securing screw 29), and a rear grill 30 covers the rear opening of the perimeter frame. A fan impeller 32 is rotatably mounted to the motor for being rotated by the motor to pull air in through the rear opening and push air out of the front opening.

Significantly, the fan support assembly 14 provides pivoting adjustment of the orientation of the fan assembly about at least two axes with respect to the golf cart. The fan support assembly is adapted to permit pivoting of the fan assembly about both a horizontally-oriented axis and about a vertically-oriented axis. The fan support assembly may comprise a mounting member 34 mountable on the upper edge portion of the dash portion of the golf cart. The mounting member may include a plate 36, and may include a pair of bolts 38, 39 extending from the plate. A nut 40, 41 may be mounted on each of the bolts for securing the plate against the upper edge portion of the dash portion of the golf cart. The fan support assembly preferably may include a substantially horizontally oriented base member 42 and a pair of substantially vertically oriented arm members 44, 46 mounted to the base member at spaced locations on the base member. The base and arm members may form a U-shaped structure for embracing a portion of the perimeter frame of the fan assembly.

The arm members 44, 46 may have free upper ends 48, 49 that are pivotally connected to opposite locations 50, 51 on the perimeter frame such that the perimeter frame pivots about an axis 52 passing through the opposite locations on the frame. Each opposite location preferably is at a medial location on one of side portions 54, 55 of the perimeter frame such that approximately half of the weight of the fan assembly is located on each side of the axis for a balanced configuration between the top half and the bottom half of the fan assembly. Ideally, one of the arm members may be pivotally mounted to the mounting member such that the fan assembly is pivotable about a vertical axis of one of the arm members to allow swing movement of the fan assembly between first and second positions. The first position is characterized by the plane of each grill (and the front opening) being oriented substantially parallel to the forward opening and the dash portion of the golf cart to maximize air flow through the forward opening. The second position is characterized by the plane of each grill (and the front opening) being oriented substantially perpendicular to the forward opening and the dash portion of the golf cart to thereby minimize obstruction of vision through the forward opening of the golf cart when needed, such as, for example, when the golf cart is being operated by shorter individuals.

Ideally, a switch 56 may be positioned on the perimeter frame. The switch is electrically connected to the motor of the fan assembly, and is electrically connectable to the power electrical circuit of the golf cart such that the switch controls electrical current to the motor. This electrical connection may be effected by wires 58, 59 extending from the motor and out of the interior of the perimeter frame.

In use, the fan assembly may be positioned such that the front opening of the perimeter frame is oriented substantially parallel to the forward opening of the golf cart so that the fan assembly blows air directly onto the driver of the golf cart. If a passenger is present in the golf cart, the fan assembly may be swung so that it is at an acute angle with respect to the forward opening of the golf cart, so that the direction of the air exiting the fan assembly passes more towards the passenger. During times when the fan assembly is not being used, or when greater visibility is desired through the forward opening of the golf cart, the fan assembly may be swung to a position substantially perpendicular to the forward opening of the golf cart, in a position either inside the cart or extending through the forward opening and out of the cart (e.g., over the hood portion of the cart). The fan assembly may also be tilted about a horizontal axis to further adjust the direction of the air flowing from the fan assembly. Significantly, the positioning of the tilting axis through a middle portion of the perimeter frame permits better holding of the tilt position of the fan assembly by the pivot couplings through a substantially equal weight distribution on either side of the tilt axis. This is especially important for golf carts which travel over less than smooth terrain that tends to shake the fan assembly and move the fan assembly from its selected position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf cart passenger cooling system for use with a golf cart having a dash portion with a steering wheel and an upper edge portion, a forward opening for viewing through when operating the golf cart, the forward opening being defined by the upper edge portion and a roof support member, the golf cart having an electrical power circuit, the cooling system comprising:

a fan assembly including a perimeter frame for defining a perimeter about an interior of the fan assembly, the perimeter frame having substantially planar front and rear openings; and a fan support assembly mounted on the fan assembly, the fan support assembly being adapted for mounting to the golf cart for supporting the fan assembly on the golf cart;

wherein the fan support assembly provides pivoting adjustment of the orientation of the fan assembly about at least two axes with respect to the golf cart, the fan support assembly being adapted to permit pivoting of the fan assembly about a horizontally-oriented axis and about a vertically-oriented axis to allow swing movement of the fan assembly between a first position having the plane of the front opening oriented substantially parallel to the forward opening and the dash portion of the golf cart to maximize air flow through the forward opening, and a second position having the plane of the front opening oriented substantially perpendicular to the forward opening and the dash portion of the golf cart to minimize obstruction of vision through the forward opening of the golf cart.

2. The cooling system of claim 1 wherein the fan support assembly comprises a substantially horizontally oriented base member and a pair of substantially vertically oriented arm members mounted to the base member at spaced locations.

3. The cooling system of claim 2 wherein the base and arm members form a U-shaped structure.

4. The cooling system of claim 2 wherein the arm members have free upper ends pivotally connected to opposite locations on the perimeter frame of the fan assembly such that the frame pivots about an axis passing through the opposite locations.

5. The cooling system of claim 4 wherein each opposite location is at a medial location on one of a pair of side portions of the perimeter frame such that approximately half of the weight of the fan assembly is located on each side of the axis.

6. The cooling system of claim 1 wherein the fan support assembly includes a mounting member mountable on the upper edge of the dash portion of the golf cart, a base member and a pair of arm members mounted to the base member at spaced locations, and wherein one of the arm members is pivotally mounted to the mounting member such that the fan assembly is pivotable about a vertical axis of one of the arm members.

7. The cooling system of claim 6 wherein the mounting member has a plate and a pair of bolts extending from the plate, and a nut is mounted on each of the bolts.

8. The cooling system of claim 1 wherein a fan support is mounted on the perimeter frame and extending into the interior to a central location of the interior.

9. The cooling system of claim 8 wherein the fan assembly includes a fan motor positioned in the interior of the perimeter frame, the fan motor being mounted on the fan support at a central location in the interior, and a fan impeller rotatably mounted to the motor for being rotated by the motor to pull air in through the rear opening and push air out of the front opening.

10. The cooling system of claim 8 wherein the fan assembly includes a front grill covering the front opening of the perimeter frame and a rear grill covering the rear opening of the perimeter frame.

11. The cooling system of claim 1 additionally comprising a switch positioned on the frame, the switch being electrically connected to the motor and being electrically connectable to the power electrical circuit of the golf cart such that the switch controls electrical current to the motor.

12. A golf cart passenger cooling system for use with a golf cart having a dash portion with a steering wheel and an upper edge portion, a forward opening for viewing through when operating the golf cart, the forward opening being defined by the upper edge portion and a roof support member, the golf cart having an electrical power circuit, the cooling system comprising:

a fan assembly; and a fan support assembly mounted on the fan assembly, the fan support assembly being adapted for mounting to the golf cart for supporting the fan assembly on the golf cart;

wherein the fan assembly comprises a perimeter frame for defining a perimeter about an interior of the fan assembly, the perimeter frame having substantially planar front and rear openings into the interior, a fan support mounted on the perimeter frame and extending into the interior to a central location of the interior, a fan motor positioned in the interior of the perimeter frame, the fan motor being mounted on the fan support at a central location in the interior, a front grill covering the front opening of the perimeter frame and a rear grill covering the rear opening of the perimeter frame, a fan impeller rotatably mounted to the motor for being rotated by the motor to pull air in through the rear opening and push air out of the front opening;

wherein the fan support assembly provides pivoting adjustment of the orientation of the fan assembly about at least two axes with respect to the golf cart, the fan support assembly being adapted to permit pivoting of the fan assembly about a horizontally-oriented axis and about a vertically-oriented axis, the fan support assembly comprising a mounting member mountable on the upper edge of the dash portion of the golf cart, the mounting member having a plate and a pair of bolts extending from the plate and having a nut mounted on each of the bolts, the fan support assembly comprising a substantially horizontally oriented base member and a pair of substantially vertically oriented arm members mounted to the base member at spaced locations, the base and arm members forming a U-shaped structure, the arm members having free upper ends pivotally connected to opposite locations on the perimeter frame such that the frame pivots about an axis passing through the opposite locations, wherein each opposite location is at a medial location on one of side portions of the perimeter frame such that approximately half of the weight of the fan assembly is located on each side of the axis, one of the arm members being pivotally mounted to the mounting member such that the fan assembly is pivotable about a vertical axis of one of the arm members to allow swing movement of the fan assembly between a first position with the plane of each grill oriented substantially parallel to the forward opening and the dash portion of the golf cart to maximize air flow through the forward opening and a second position with the plane of each grill oriented substantially perpendicular to the forward opening and the dash portion of the golf cart to minimize obstruction of vision through the forward opening of the golf cart; and a switch positioned on the frame, the switch being electrically connected to the motor and being electrically connectable to the power electrical circuit of the golf cart such that the switch controls electrical current to the motor.

* * * * *